United States Patent [19]

Dunstan et al.

[11] Patent Number: 4,523,240
[45] Date of Patent: Jun. 11, 1985

[54] HIGH PRECISION FLOPPY DISC MEMORY SYSTEM

[75] Inventors: Ericson M. Dunstan, Hidden Hills; William J. Gervais, Northridge; S. Barry McClelland, Woodland Hills, all of Calif.

[73] Assignee: Micropolis, Chatsworth, Calif.

[21] Appl. No.: 42,721

[22] Filed: May 25, 1979

Related U.S. Application Data

[63] Continuation-in-part of Ser. No. 863,309, Dec. 22, 1977.

[51] Int. Cl.³ .............................................. G11B 5/016
[52] U.S. Cl. ......................................... 360/99; 360/97
[58] Field of Search ...................................... 360/97–99, 360/86, 76, 106, 109

[56] References Cited

U.S. PATENT DOCUMENTS

| | | | |
|---|---|---|---|
| 3,737,880 | 6/1973 | Kelley | 360/99 |
| 3,814,441 | 6/1974 | Craggs | 360/99 |
| 3,840,897 | 10/1974 | Kelley et al. | 360/99 |
| 3,898,814 | 8/1975 | Chou et al. | 360/99 X |
| 4,001,888 | 1/1977 | Morgan | 360/98 X |
| 4,005,493 | 1/1977 | Morgan | 360/97 X |
| 4,024,581 | 5/1977 | Lesca et al. | 360/99 |
| 4,052,746 | 10/1977 | Weller | 360/99 |
| 4,097,908 | 6/1978 | Chou et al. | 360/97 X |
| 4,171,531 | 10/1979 | Grapes et al. | 360/97 |

FOREIGN PATENT DOCUMENTS

2330358 1/1974 Fed. Rep. of Germany ........ 360/99

*Primary Examiner*—John H. Wolff
*Attorney, Agent, or Firm*—Poms, Smith, Lande & Rose

[57] ABSTRACT

A "floppy" disc digital magnetic storage apparatus or subsystem includes a number of interrelated features permitting greatly increased data storage and good access time, while using relatively inexpensive parts. The features contributing to the greatly increased storage capacity include arrangements for providing one hundred tracks per inch, and for holding tolerances so that the position of the magnetic head in the radial direction is maintained within the required value of plus or minus 1.7 thousandths of an inch. Features contributing to the high accuracy of magnetic head positioning, and the resultant high data capacity, include the following: (1) mounting the lead screw which positions the magnetic head with its inner end close to the center of the magnetic disc fixed in position, and with its outer end and the stepping motor secured to it mounted on a leaf spring pushing the motor and the outer end of the lead screw inward toward the inner end of the lead screw: (2) utilizing a simple sheet metal stepper motor having two sets of punched metal teeth which interfit with one another and which are exposed to a central permanently magnetized rotor having north and south poles successively located around its periphery; two coils are provided and each of these coils can be energized in opposite directions, with the four combinations resulting in progressive stepping of the permanent magnetic armature, with every fourth step having a more accurately defined angular position than the three intermediate steps; (3) by a special energization arrangement, the rotor is moved four steps at a time to shift the head from one track to the next, thereby using only the more accurately located angular positions, and reducing the adverse effects of friction on head positioning; (4) the electronic circuitry associated with driving the step motor is configured to offset any time penalty incurred by taking four steps to move one track; (5) the floppy disc is accurately positioned relative to the inner end of the lead screw by forcing the magnetic disc to an interference fit relationship with the driving spindle hub on which it is mounted, and (6) the lead screw is ground to mate with a conical pin secured to the movable head assembly.

14 Claims, 10 Drawing Figures

HIGH PRECISION FLOPPY DISC MEMORY SYSTEM

RELATED APPLICATIONS

This is a continuation-in-part of U.S. patent application Ser. No. 863,309, filed Dec. 22, 1977.

FIELD OF THE INVENTION

This invention relates to floppy disc digital storage apparatus or subsystems.

BACKGROUND OF THE INVENTION

Floppy disc subsystems have generally used lead screws which extend from near the center of the floppy disc to a stepping motor which is located at a radial position beyond the outer periphery of the disc. Normally the stepping motor is rigidly secured to a baseplate as is the disc drive. Further, the lead screw is normally integral with the drive shaft of the stepping motor, and the inner end is often merely journalled in a bearing adjacent the center of the disc. Accordingly, as the floppy disc unit is set into operation and used for extended periods of time, the baseplate, the stepping motor, and the lead screw, as well as the floppy disc may all heat up to various final temperatures, and may also have many combinations of intermediate thermal variations. These factors mean that the position of the head, which is determined by the lead screw, can shift to a very significant extent relative to the radial position on the disc. In addition, successive steps in a stepping motor may often be shifted significantly as compared with the expected angular increment of the stepper motor. These discrepancies in the steps result from mechanical variations in manufacturing and the like. In addition, the friction forces in the stepping motor introduce a significant residual error in angular position for the stepper motor. And finally, additional errors in track location may be introduced by the loose fit of the magnetic disc on the driving hub. As a result of these adverse factors, most floppy disc subsystems only have approximately 48 tracks per inch, with a resultant track spacing of about 21 thousandths of an inch.

Reference is also made to S. A. Morgan U.S. Pat. No. 4,001,888, granted Jan. 4, 1977, and P. Lesca, U.S. Pat. No. 4,024,581, granted May 17, 1977. These and other patents show arrangements which would improve the location of the magnetic head relative to the magnetic disc; however, the designers apparently did not appreciate the fact that a complete analysis and design is required to avoid loss of information, and that improving the tolerances in one part of the design is of little or no significance, if loose tolerances are present elsewhere.

A principal object of the present invention is to significantly reduce the variable factors outlined above, and thus greatly increase the accuracy of head positioning and/or data storage capacity of the floppy disc apparatus.

SUMMARY OF THE INVENTION

In accordance with one feature of the present invention, the inner end of the magnetic head positioning lead screw is fixedly mounted against longitudinal movement near the central hub on which the magnetic disc is mounted for rotation. The outer end of the lead screw forms an integral part of the drive shaft of a stepping motor and the stepping motor is mounted on the frame of the apparatus against lateral movement but in a manner so that it is free to move axially relative to the drive shaft. Further, the mounting frame may include a spring element, which loads the lead screw so that the thrust bearing which mounts the inner end of the drive shaft is always biased in the same direction. This feature, when combined with other disc-to-magnetic head tolerance reduction steps, greatly reduces the mechanical variations in positioning of the head relative to the disc.

In accordance with another important feature of the invention, the stepper motor which is connected to the lead screw mentioned above has successive positions which are located a predetermined number of steps apart, which are more accurately located with respect to one another, than are the intermediate stepper motor positions; and the stepper motor is energized to shift position by this predetermined number of steps. In this way, the stepper motor is more accurately positioned than would be possible if each step were utilized, and certain residual frictional effects which introduce angular errors are also reduced in their adverse effect on head positioning.

Further, the stepping motor may be energized with a special pattern of acceleration and deceleration voltages to rapidly shift by the desired predetermined number of steps, thereby avoiding increasing the time for shifting tracks, despite the multiple step angle through which the stepping motor moves.

In accordance with an interrelated feature of the invention, the central driving hub for the floppy disc makes an interference fit with the disc to provide an accurate central reference point from which the lead screw positioning may be accomplished. Further, the central hub of the magnetic disc spindle and the thrust bearing which mounts the inner end of the lead screw may be mounted in a single mounting block to insure a firm and vibration-free relationship between these important elements of the magnetic head positioning system.

A specific advantage of the present system is the elimination of the baseplate from the "positioning loop" which determines the relative location of the magnetic head and the track, so that the system is not subject to the lack of dimensional stability (resulting from thermal or other effects) of this element.

In accordance with an important advantage of the present invention, it had been determined that a track density of 100 tracks per inch can readily be achieved using the principles of the present invention. Further, with the greatly increase storage capacity which is achieved, 5¼ inch floppy disc systems made in accordance with the principles of the present invention have as much data storage capacity as 8 inch floppy disc systems of a number of other manufacturers.

Other objects, features, and advantages of the invention will become apparent from a consideration of the following detailed description and from the accompanying drawings.

BRIEF DESCRIPTION OF THE DRAWINGS

FIGS. 6-A through 6-D show the logic circuitry which controls the energization of the stepper motor coils; and FIG. 7 includes a series of plots of voltages which appear at various indicated points in the circuitry of FIGS. 6-A through 6-D.

DETAILED DESCRIPTION

Figure 1:
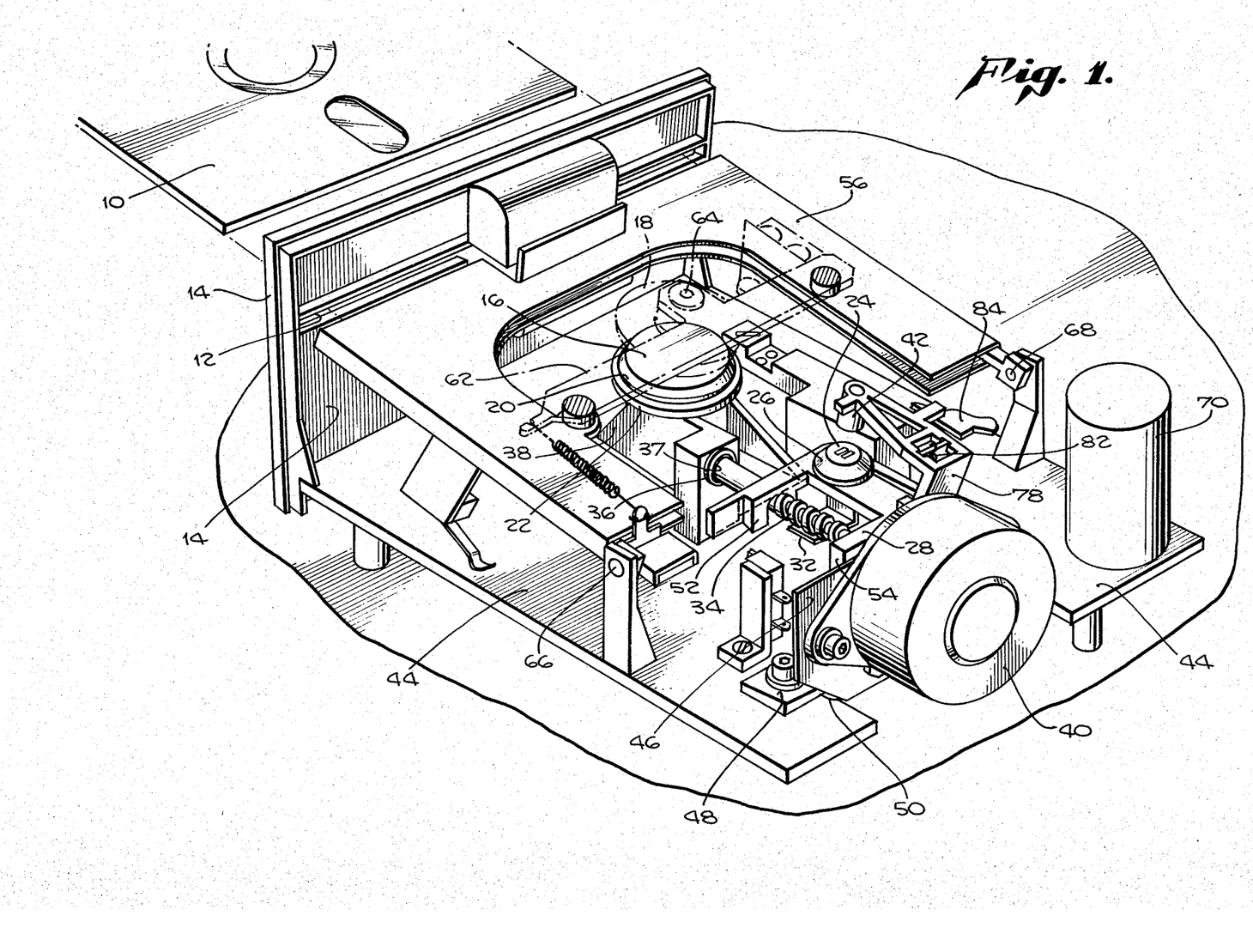
FIG. 1 is an isometric view of a floppy disc subsystem or apparatus illustrating the principles of the invention.
Figure 2:
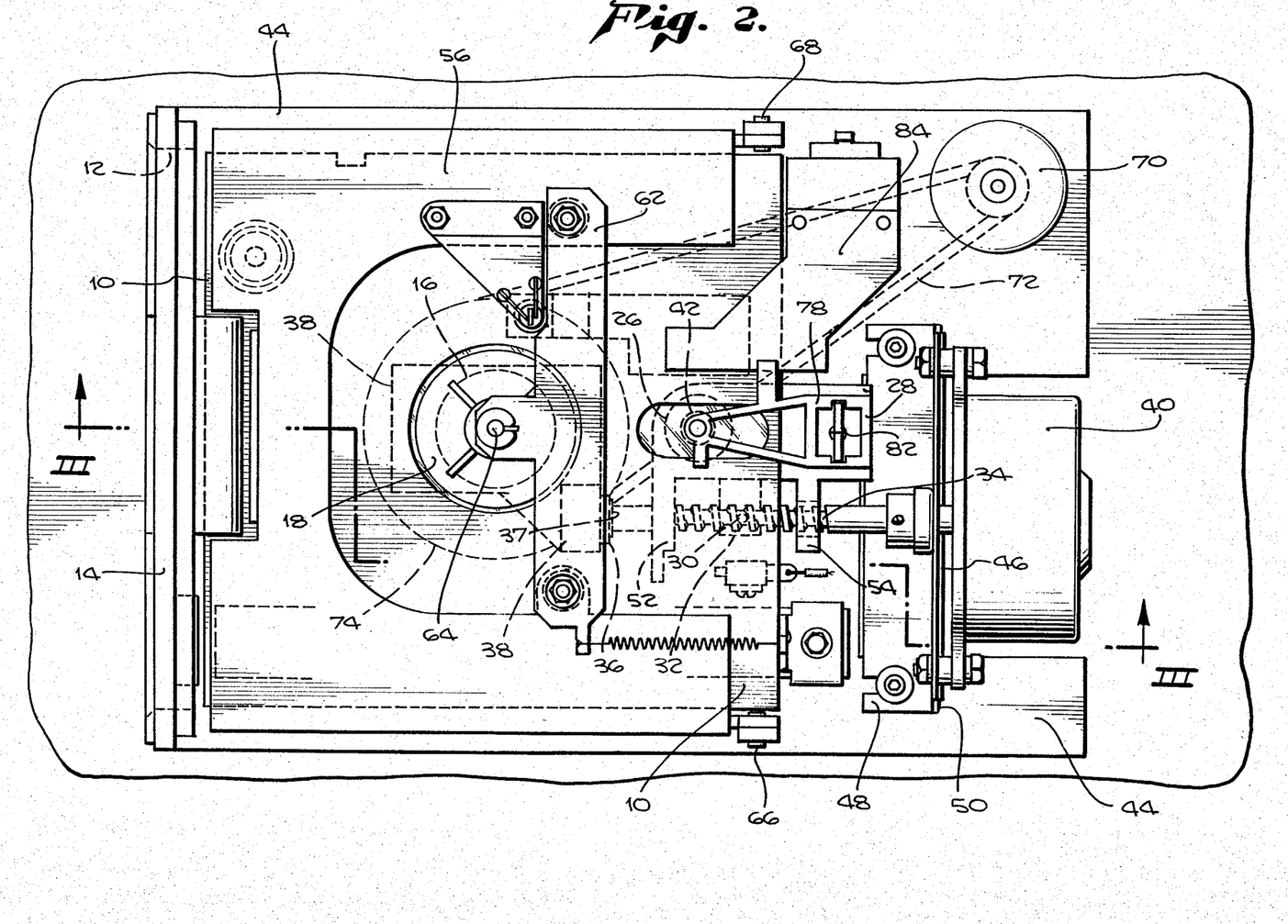
FIG. 2 is a top view of the apparatus of FIG. 1.
Figure 3:
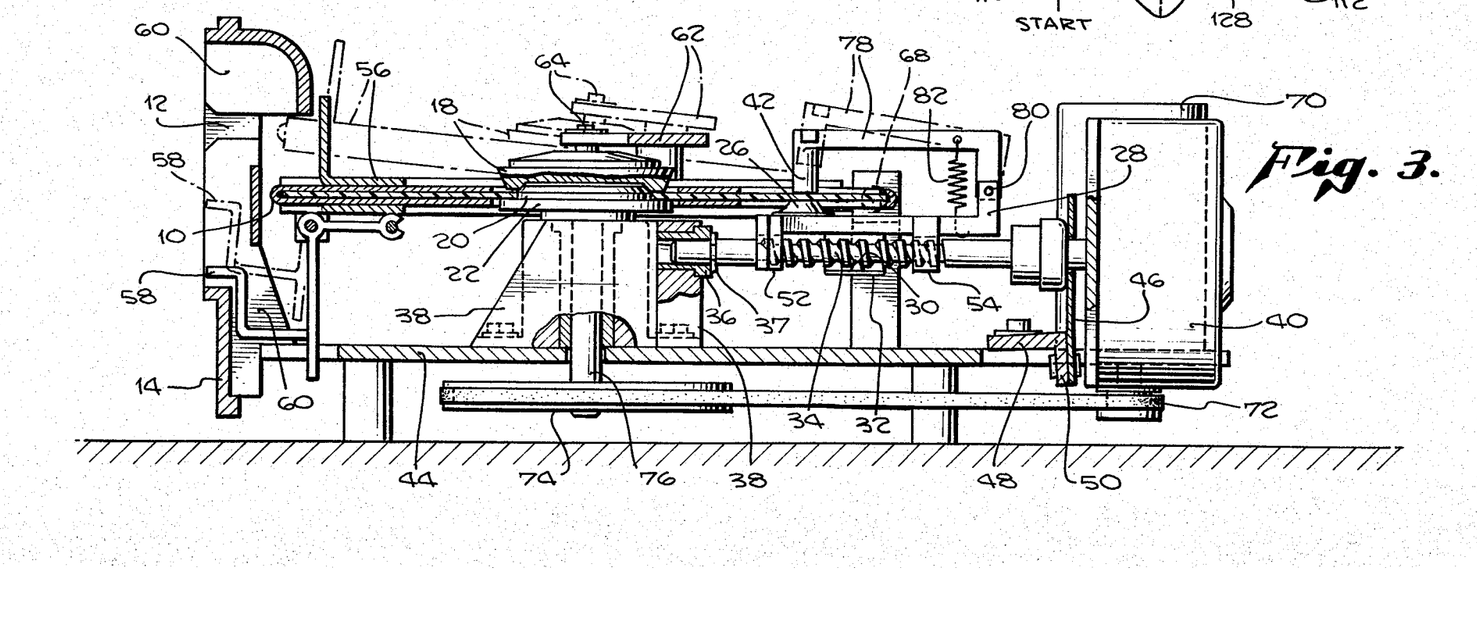
FIG. 3 is a cross-sectional view taken along line III—III of FIG. 2.

FIGS. 1, 2, and 3 show the physical construction of the floppy disc digital memory subsystem or apparatus of the present invention. In these figures of the drawings, in which like reference numerals refer to like parts, the floppy disc element 10 is inserted through a slot 12 in the front panel 14 of the assembly. After the floppy disc is fully inserted into the unit, with the opening at the center of the floppy disc being aligned with the hub 16 and the freely rotatable clamping member 18, the disc is clamped in position with the clamping member 18 bearing firmly down on the disc and forcing an accurate fit, ranging from a line-to-line to an interference fit depending on tolerances, on the vertical portion 20 of the hub 16, adjacent the horizontally extending flange 22. This accurate fit on the hub 16 provides an accurate starting point for the precise location of the magnetic head 24 which is embedded in the rounded plastic member 26 which is mounted on the carriage 28. The carriage 28 is accurately located in the radial direction by a conical pin 30 mounted on a leaf spring 32 which is secured to the bottom of the carriage 28. The pin 30 makes a close fit with the thread of the lead screw 34 which extends between the bearing 36 mounted in a central mounting block 38 and the stepping motor 40. Incidentally, a lightweight pressure pad 42 is actuated to bear on the floppy disc and bring it into firm engagement with the head 24 during actual reading and writing operating periods. In place of the pressure pad 42, a second magnetic head may be mounted on the upper pivoted support member 78 (See FIGS. 1 and 3), and may be positioned at a track on the disc spaced by one or a few tracks from the position of the lower head 24. In addition to providing further access to data on the disc, engagement by the upper head brings the disc into engagement or close proximity with head 24.

One of the important features of the present invention involves the arrangements for mounting the lead screw 34. More specifically, the inner end of the lead screw 34 is mounted in the thrust bearing 36 and is fixed by the thrust bearing 36 and the spring steel lock ring 37 against longitudinal movement to the left as shown in FIG. 3. Further, because the thrust bearing 36 is mounted in the same mounting block 38 in which the central hub 16 is journalled, an accurate and constant relative position of the inner end of the lead screw 34 relative to the center of the disc which is mounted on hub 16, is assured.

Most prior art floppy disc memory subsystems have the stepper motor, such as that shown at 40, separately mounted on the baseplate 44 of the apparatus. Under these circumstances, the distance of the lead screw, and accordingly, the distance of the magnetic head from the center of rotation of the disc may vary as the temperature of the baseplate 44 changes, thus shifting the position of the stepper motor toward or away from the center of the disc, in accordance with the thermal expansion characteristics of the baseplate. However, in accordance with one feature of the present invention, the stepper motor 40 is not rigidly secured to the base 44, but instead is resiliently mounted for axial movement along the axis of the lead screw 34. More specifically, the motor 40 is mounted on a leaf spring 46 which in turn is securely fastened to the substantially vertical portion of the L-shaped mounting bracket 48 which in turn is bolted or otherwise secured to the baseplate 44 of the unit. By suitable adjustment of the position of the mounting bracket 48 along the axis of the motor and lead screw, the spring will be bent so as to apply the required load pressure to the left as shown in FIG. 3. This has the effect of eliminating any play or lost motion which might otherwise be present in the unit. It may be noted that the depending leg 50 of the L-shaped bracket 48 makes an oblique angle slightly more than 90° with the upper portion, so that when the leaf spring 46 is biased to provide inward pressure on the lead screw 34 toward the thrust bearing 36, the front surface of stepper motor 40 is oriented at a 90° angle with respect to the lead screw.

Incidentally, the lead screw 34 is very accurately formed, and its helical groove of tapered cross-section is formed by grinding the cylindrical shaft. The conical pin 30 is firmly pressed into the tapered groove in the lead screw to accurately shift the position of carriage assembly 28 and magnetic head 24 in the plastic nub 26, as the stepper motor 40 is energized to shift tracks on the disc. The carriage 28 has front and rear upper guide and support members 52 and 54 that have V-type surfaces bearing on the upper surface of lead screw 34.

The conical pin engages the groove substantially in a single plane. Accordingly, despite wear of the pin and of the lead screw, following extended usage, there will be no lost motion, or backplay between the carriage carrying the magnetic head and the lead screw. This may be contrasted with conventional nut and lead screw, which become worn after substantial usage, so that there is some lost motion, when the direction of rotation of the screw is changed.

Concerning another point, to insure the accurate location and centering of the magnetic disc on the hub 16, the hub 16 is provided with a small vertical portion 20 which makes a very tight or an interference fit with the disc, and the upper freely rotatable assembly 18 forces the disc down onto this full sized portion 20. As compared with the nominal range of dimensions of the aperture in the disc, the diameter 20 is sized to provide a fit which ranges from an exact or "line-on-line" fit to an interference of about two and one-half thousandths of an inch.

In the foregoing description, particular attention has been given to the structural features relating to the accurate positioning of the magnetic head 24 relative to the disc which is mounted for rotation on the central hub 16. Now, a more general description of some of the other parts of the apparatus which appear in the mechanical showings of FIGS. 1 through 3 will be set forth.

Initially, with reference to FIG. 1, it may be noted that the disc cartridge carrier 56 is tilted up at a slight angle in order to receive the disc cartridge 10 as it is inserted into the apparatus through the slot 12. After the disc cartridge 10 has been fully inserted into the carrier 56, the disc is lowered into the operating position by depressing the actuating member 58 (see FIG. 3), which is readily accessible at the center of the front panel 14 of the unit as a result of the recess 60 centrally located in the front panel and immediately above and below the slot 12. A support member 62 is mounted to the carrier 56 and is located somewhat above its surface. The clamping member 18 is mounted at point 64 to the forwardly extending leg which is centrally located on the support member 62. As mentioned above, the clamping member 18 is free to rotate with the magnetic disc, and a spring (not shown) is mounted between the clamp 18 and the support 62 to exert a downward biasing force to insure proper clamping of the magnetic disc on the section 20 of the hub 16 despite the interference fit.

Incidentally, the disc cartridge carrier 56 is mounted for pivoting at points 66 and 68, near its rear edge.

In addition to the stepper motor discussed above, and to be discussed further below, the subsystem is provided with a drive motor 70 which is coupled by belt 72 to pulley 74 to drive the hub 16 through the vertically extending shaft 76.

The movement of the upper member 78 which carries the pad 42, and which is pivotally mounted on the carriage assembly 28 at point 80, is controlled by spring 82 and an actuating member 84 which is secured to the armature of an electromagnet (not shown) so that it is pulled down when the magnetic head 24 is to be placed in operation. Under these conditions, the spring 82 pulls the member 78 down with a predetermined force to firmly bring the disc into engagement with the head 24.

Incidentally, in FIG. 3, the position of the disc cartridge receiving member 56 and its associated actuating member 58 are shown in phantom in the raised position, ready to receive the magnetic disc cartridge; and in solid lines in the operating position with the receiving member 56 lowered into operating position after the actuating member 58 has been depressed. A latching and release mechanism (not shown) is provided for maintaining the magnetic disc cartridge receiving member 56 in its upper or lower positions, following successive applications of downward pressure on the actuating member 58.

It may also be noted that the raised and lowered positions of support members 62 and 78 are also shown in FIG. 3, with the raised positions being shown in phantom, and the lower or operating positions being shown in full lines.

Figures 4, 5:
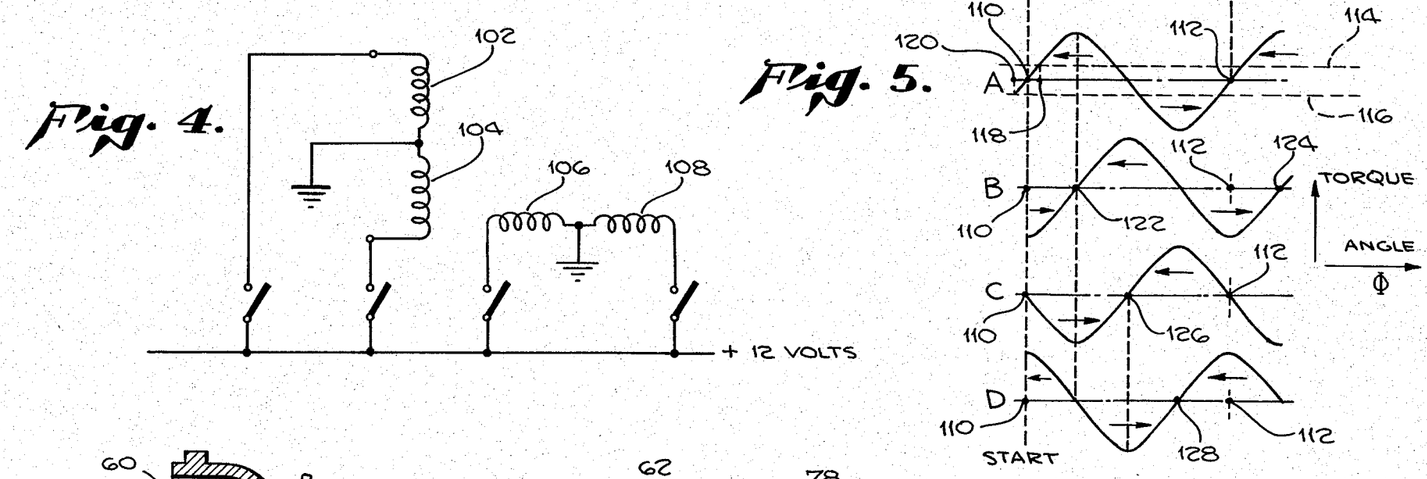
FIG. 4 is a schematic showing of the stepper motor coil energization arrangements.
FIG. 5 is a series of plots indicating torque versus angular position of the stepping motor.

The energization circuits for the stepper motor 40 are shown schematically in FIG. 4. The stepper motor 40 is of the type shown at page 4 of a publication entitled "Proceedings of the International Conference on Stepping Motors and Systems, 15th-18th July 1974, Copyright 1974, The University of Leeds, printed by Frederick Duffield & Sons, Ltd., Leeds LS42HA, England. The stator of the stepper motor has two cup-like sections of magnetizable material having interfitting teeth. The stepper motor is also provided with two windings 102, 104 associated with one of the toothed magnetic structures, and another pair of windings 106, 108 associated with the other magnetic structure. A central circular permanently magnetized rotor is provided with alternate north and south magnetic poles around its periphery, and with a pole spacing corresponding to that of the toothed magnetic structures of the stator. In the normal mode of operation, as the windings 102, 104, and 106 and 108 are energized, one at a time (in the particular stepping motor), the teeth of the magnetic structures are energized first with a north polarity and then with a south polarity to step the rotor forward.

In the plots of FIG. 5, the torque versus angular position characteristic for the four coil energizations is shown. Plot 5-A is the characteristic with coil 102 energized; plot 5-B is effective when coil 106 is energized; plot 5-C relates to coil 104; and the torque vs. angle characteristic for coil 108 energization is shown in plot 5D. Torque in one angular sense is represented by points above the axis and torque in the opposite direction by points below the axis. Accordingly, the angular step positions for the rotor in FIG. 5-A are represented by points 110 and 112, with the directions of the torque being indicated by the arrows in FIG. 5A, as well as in the other plots of FIG. 5.

The effect of friction is also indicated in FIG. 5A by the dotted lines 114 and 116 representing the opposing frictional torque of the system in which the stepper motor is employed. With the rotor located between points 118 and 120, it may be noted that the frictional force or torque is greater than that provided by the stepping motor. Accordngly, there is a possibility that the rotor may be positioned at any angle between point 118 and point 120, instead of precisely at point 110 which is the theoretical angular position of the stepper motor rotor.

In a similar manner, when coil 106 is energized, the two stable points for the rotor are shown at 122 and 124 in FIG. 5B; in FIG. 5-C the stable point is at 126; and for FIG. 5D the stable rotor position is represented by point 128.

While it might be expected that the points 110 (FIG. 5-A), 122 (FIG. 5-B), 126 (FIG. 5-C), 128 (FIG. 5-D), and 112 (FIG. 5-A), would represent evenly spaced angular positions of the rotor as it is stepped through 360°, it has been determined, in accordance with one aspect of the present invention, that this is not the case. More specifically, it has been determined that with the manufacturing tolerances normally used in inexpensive stepper motors, that the angular positions corresponding to the energization of any one of the four coils, are more accurately related to one another than are the positions of the intermediate positions with others of the four stepper motor coils energized, on a percentage error basis. Thus, the stable points 110 and 112 are more accurately positioned relative to one another than are the intermediate points 122, 126 and 128. Similarly, the two stable points 122 and 124 would be more accurately located with respect to one another, than to other stable stepper motor positions which involve energization of different coils.

In order to improve the accuracy of positioning of the magnetic head, which is located by the stepper motor, therefore, the stepper motor is advanced by four steps in each case, and the intermediate stable positions of the stepper motor are not used for the positioning of the head. This technique improves the accuracy of location of the magnetic head in two ways. First, the effect of displacement of the intermediate stepper motor positions of different coil energizations is eliminated. Secondly, the error introduced by frictional forces is reduced by one-fourth. More specifically, it may be noted that, if the stepper motor were only stepped from point 110 (FIG. 5-A) to point 122 (FIG. 5-B) the possible frictional error, from point 118 to 120, would be a substantial factor. However, when the stepper motor is stepped from point 110 to point 112, and this is made to correspond to the desired distance between tracks on the magnetic disc, then the effect of the frictional torque error is reduced by one-quarter.

While the system could be operated by stepping through each of the four stable points, it is quicker to energize the stepper motor coils in a predetermined timed manner so that the rotor does not stop at each of the normally stable intermediate positions. This may be accomplished as will be described below in connection with the logic circuit diagram of FIGS. 6-A through 6-D, and the plots of FIG. 7.

Figure 6A:
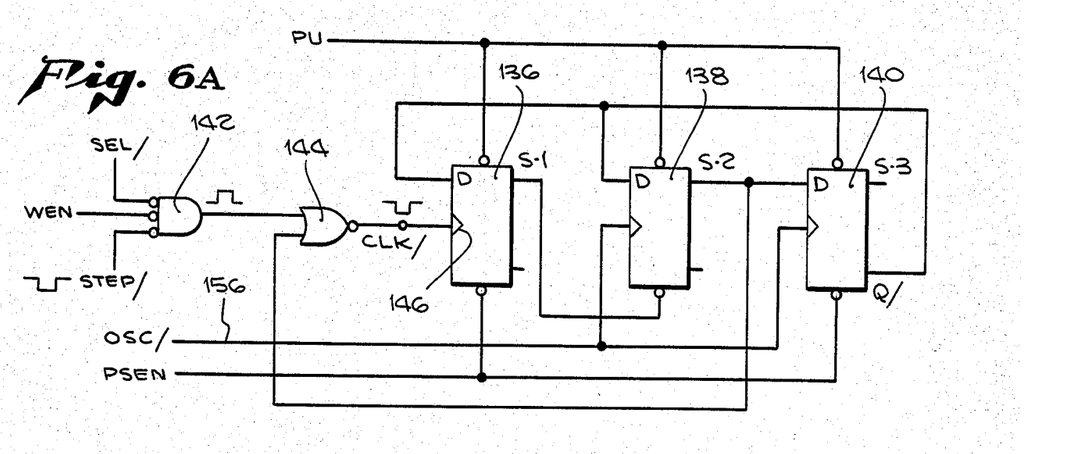
Figures 6B, 6C, 6D, 7:
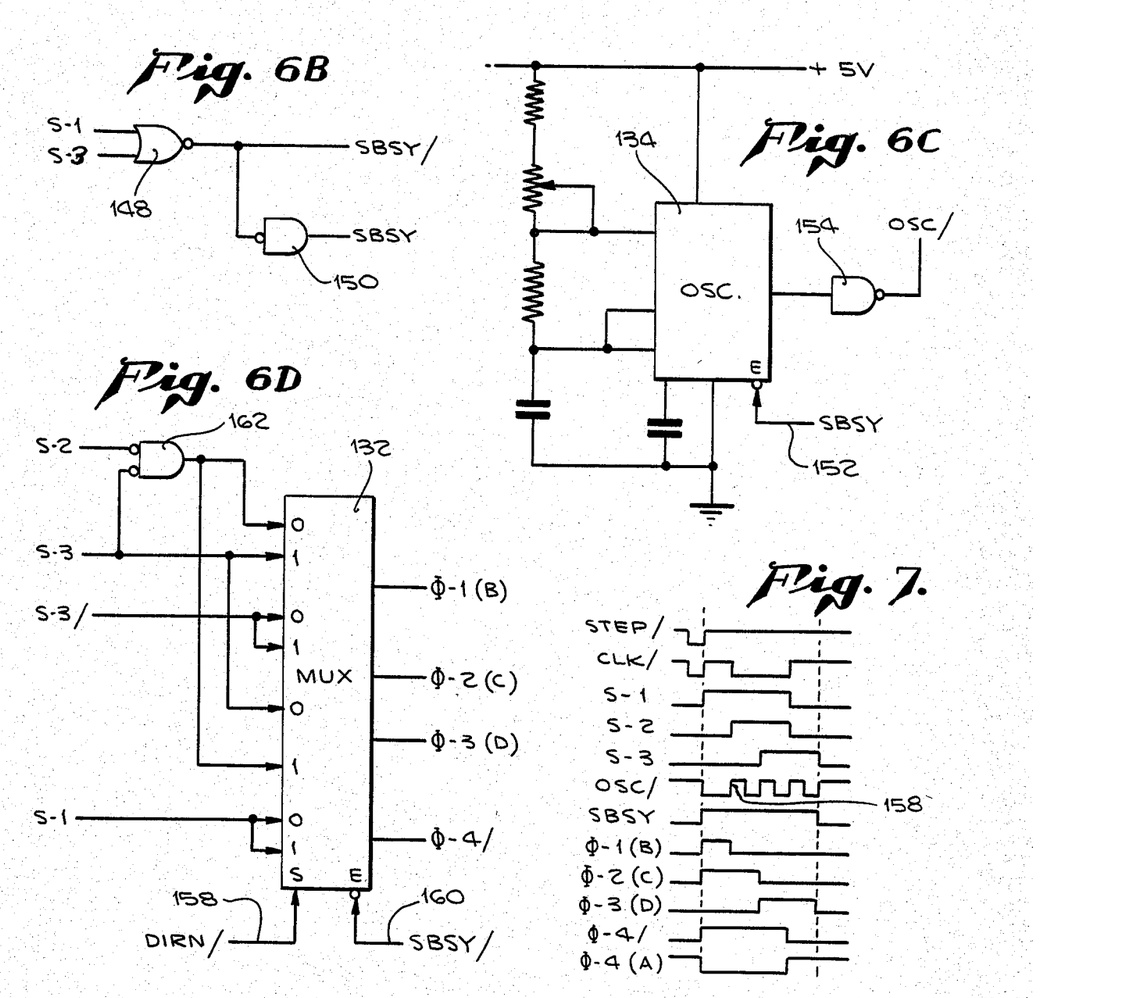

Before considering the detailed logic circuit of FIG. 6, the overall principles which are involved will be considered in connection with the plots of FIG. 5 and FIG. 7. Initially, between each stepping cycle, coil 102 is energized, thereby holding the stepping motor rotor at points such as point 110 or 112, as shown in FIG. 5-A. Incidentally, the last plot of FIG. 7, designated $\phi$-4 (A), indicates the interval of time when coil 102 is energized.

Now, in reviewing the torque characteristics of FIGS. 5-A through 5-D, it may be noted that the torque characteristic of FIG. 5-B will apply torque to the rotor to move it toward the desired point 112 (see FIG. 5-A); and that as soon as any movement in this direction has occurred, the characteristic of FIG. 5-C, corresponding to energization of coil 104 in FIG. 4, would supply additional torque. Accordingly, as shown in the plots of $\phi$-1 (B), $\phi$-2 (C), and $\phi$-4 (A), in FIG. 7, at the time that the magnetic head is to be shifted to the next track, coil 102 is turned off as indicated by $\phi$-4 (A); and coils 106 and 104 are energized, see $\phi$-1 (B) and $\phi$-2 (C). This has the effect of rapidly accelerating the rotor from point 110 toward point 112 (see FIG. 5-A).

The step cycle as shown in FIG. 7 is broken up into four equal time intervals. After the first of these intervals has elapsed, coil 106, $\phi$-1 (B), is de-energized, because the rotor is at or near point 122 where the torque for this coil reverses. Coil 104 corresponding to $\phi$-2 (C), remains energized through the second time interval, and half way through the shift or step cycle coil 104, $\phi$-2 (C) is turned off, and coil 108 $\phi$-3(D) is turned on. It continues to provide forward torque until point 128 (FIG. 5-D) is passed, and then it provides deceleration, along with coil 102, $\phi$-4 (A), as the rotor approaches point 112.

Incidentally, in considering the acceleration and deceleration forces, it must be remembered that the movement is at all times opposed by the frictional forces as indicated by dashed lines 114 and 116 in FIG. 5-A. Also, concerning the last two graphs of FIG. 7, note that the next-to-last of the two graphs, $\phi$-4/ represents the inverse of $\phi$-4 (A), the last plot of FIG. 7. More generally, throughout the consideration of the logic circuitry and related matters in this specification, the symbol "/" will be used to indicate the "Boolean Algebra" or logical inverse of the "unslashed" function.

Detailed consideration will now be given to FIGS. 6A, 6B, 6C and 6D which constitute one logic circuit which provides the output waveforms included in FIG. 7. In the actual implementation of the stepper motor coil switching circuitry, the signal $\phi$-4/ was required rather than $\phi$-4 (A). Accordingly, the output $\phi$-4/ is shown as the next to last plot in FIG. 7, in addition to the signal $\phi$-4 (A), which appears as the final plot in FIG. 7. Also, in FIG. 6, the $\phi$-4/ signal is shown at the output from multiplexer 132. In addition, in connection with FIG. 4, the coil switches may be implemented by semiconductor controlled switching circuitry rather than by movable contact type switches.

It is noted in passing that it has previously been proposed to step a stepping motor several steps with rapid acceleration and deceleration and without intermediate stopping, see the "Proceedings" previously cited, at pages 24 and 25, Section 8, Multi-Step Incremental Motion and Step Motor Selection, pp. 37-55. These generalized articles, however, do not recognize the important fact that stepping motors have angular step positions separated by a predetermined fixed (for each motor) number of normal steps, which are more accurately located with respect to one-another than other step positions. Recognition of this fact and the use of multiple-step stepping through angles equal to this number of steps has helped achieve the much higher head positioning accuracy, and resultant higher density storage attained by the system described herein.

In the logic circuitry of FIGS. 6-A through 6-D, conventional logic circuit symbols are generally employed. The logic symbol for an AND gate has a flat input side, and the output is approximately semi-circular. OR gates have a curved input side, and the output side is two arcs which intersect to form an output point. The AND and OR functions are considered in terms of "high" signals, which may be a few volts positive (such as +3 or +4 volts), as compared with "low" signals which are at or near ground potential between ground and +0.8 V). Logic circuit inversion is indicated by a small circle, normally at the input or output to and AND or an OR gate, or other logic circuits.

Apart from the AND and OR gates, the principal additional circuits in FIGS. 6A through 6D are the oscillator 134 of FIG. 6C, and the three "D" type flip-flops 136, 138 and 140 of FIG. 6A. These "D" flip-flops, when enabled and clocked will "copy" the signal applied to the "D" input terminal.

Now, considering the detailed operation of FIGS. 6A through 6D, initially, all of the flip-flops 136, 138 and 140 are reset, and the oscillator is disabled. The AND gate 142 has three inputs, "Step/" or a negative going Step signal, the write enable signal "WEN", and the inverse select "SEL/" input. The three small circles at the input to the AND gate 142 indicate that it only produces a "high" output when all three inputs are "low". The WEN input prevents track shifting when the disc memory subsystem is in the process of writing on the disc.

Assuming that the WEN high signal is not present, and that the SEL/ signal is present, the arrival of a Step/ signal will initiate operation of a shift or step cycle. Specifically, the three low inputs to circuit 142 will produce a high output pulse to OR gate 144, which inverts the positive pulse to provide a suitable low pulse at the clock input 146 to flip-flop 136, The "D" input of flip-flop 136 is connected to the Q/ output of the third flip flop 140. Of course, with all flip flops, including flip flop 140 in the reset state, the Q/ output is high, and this shifts the state of flip flop 136, so that the S-1 output becomes high. This transition is shown in the third plot of FIG. 7.

As shown in FIG. 6B, the S-1 signal is employed to develop a subsystem signal SBSY and the inverted subsystem signal SBSY/. FIG. 6B includes the OR gate plus inversion circuit 148, and the inverter 150.

The SBSY signal is applied on lead 152 to enable oscillator 134. At the output from inverter 154 is the OSC/ signal. Note that FIG. 7 shows the signals discussed above, and others, including the Step/, the CLK/, S-1, S-2, S-3, SBSY, and OSC/ signals. The OCS/ signal is of particular interest, as it includes a first half cycle as it starts up which is approximately twice as long as subsequent half cycles. A Signetics E555 oscillator chip, for specific example, has these properties.

The oscillator, or rather the OSC/ input 156 to circuit 6A, is connected to the clocking inputs of flip-flops 138 and 140. When the OSC/ signal first goes "high", as shown at 158 in FIG. 7, the flip-flop 138 "copies" the high signal from the Q/ output of flip-flop 140. However, with S2 being low at that instant, flip flop 140 does not change state, and S3 remains low. Upon the arrival of the next high-going transition on OSC/ lead 156, flip flop 140 changes state, as S2 is now high, and S3 goes high.

The Q/ output from flip flop 140 is now low, and it is connected to the "D" inputs of flip flops 136 and 138, thereby turning them both to their "off" states upon the arrival of the next "high" OSC/ signal. Incidentally, note the connection from S2 to the input of OR gate 144 which is active in resetting flip-flop 136. Finally, with S2 "low", the next "high" OSC/ signal resets flip-flop 140 to complete the cycle, as S-3 goes "low" again. S1 and S3 both being "low" cause SBSY to go "low" which disables the oscillator circuit 134.

Incidentally, the PSEN input in FIG. 6A is the Power Supply Enable Signal. It starts low when the unit is turned on, resetting flip flops 136 and 140 to their "off" states, and then after a delay of less than a second shifts to a high level where it remains until the unit is turned off.

Attention is now directed to FIG. 6D which includes the multiplexer or MUX 132. Note that the outputs from circuit 132 include $\phi$-2 (B), $\phi$-2 (C), $\phi$-3 (D) and $\phi$-4/, as previously mentioned. The multiplexer 132 has eight inputs, and four of these are selected for stepping in one direction, and a second set of four are employed to step the motor through an angle equal to four normal steps in the opposite direction. This action is accomplished under the control of the inverse directional or DIRN/ input lead 158. The SBSY/ enabling input 160, which is on while the oscillator is running, may also be noted. A "high" signal on SBSY/ disables the multiplexer, causing all four outputs to be in the "low" state.

Under normal forward stepping conditions as discussed above, the first, third, fifth and seventh inputs at the left of multiplexer 132 are used to obtain the $\phi$-1, $\phi$-2, $\phi$-3, and $\phi$-4/ outputs. AND gate 162 with inverting inputs provides a high output for $\phi$-1, only when both S2 and S3 are low, and this action may be confirmed by reference to FIG. 7. Similarly, $\phi$-2 corresponds directly to S-3/, $\phi$-3 to S-3, and $\phi$-4/ to S-1.

When it is desired to step in the reverse direction, to move the magnetic head "in" instead of "out", for example, the pattern of phase energizations must be reversed. $\phi$-4/ and $\phi$-2 remain unchanged, and $\phi$-1, and $\phi$-3 must be interchanged in order to achieve this result. Close examination of the inputs to the multiplexer 132 will show that this result has been accomplished. Incidentally, as mentioned previously, reversing the signal applied to the DIRN/ input to the multiplexer 132, reverses the stepping direction.

For completeness, the logic circuits may be implemented using the Texas Instruments 74LS family of semiconductor chips. The "D" flip flops may therefore be 74LS74 units; the AND gate 142 may be a 74LS27 unit; the OR gates 144, 148, and 162 may be 74LS02 units; the inverter 150 may be a 74LS04 chip; the inverter 154 may be a 74LS14 chip; and the multiplexer 132 may be a 74LS157 Texas Instruments component. Other compatible sets of logic units could of course be employed.

Incidentally, concerning the details of the stepper motor and lead screw relationship, the stepper motor would normally require forty-eight normal steps to complete one revolution of the rotor. For the reasons discussed in detail above, however, the stepper motor is only operated in increments of four steps, in either one direction or the other. Accordingly twelve of these big four-step steps are required for one rotation of the rotor of the stepping motor for the system employing 100 tracks per inch. The tracks on the magnetic disc are spaced 0.01 inch apart, and this means that 1/12 rotation of the lead screw 34 shifts the carriage 28 carrying head 24 by one-hundredth of an inch and that one turn of the lead screw shifts the carriage by 0.12 inch. Accordingly, the lead screw has a pitch of $8\frac{1}{3}$ turns per inch.

It is again emphasized that the present system is not limited to 100 tracks-per-inch spacing but could be used to provide increased precision for the generally used 48 tracks-per-inch systems, on up to track spacings of more than 100 tracks per inch.

In summarizing the present invention, it is noted that it is important to eliminate all of the major sources of error in order to bring the tolerances resulting from thermal and other mechanical variations to a point where double density track spacing may be employed. It is further noted that a magnetic disc, of course, has no grooves in its construction but merely is a smooth disc. Accordingly, the principles and theories applicable to grooved records or recordings are in no way applicable to the present construction. Principal advantages and structural features included in the present invention are as follows:

1. The use of track spacing significantly greater than the conventional 48 or 50 tracks per inch, up to 100 tracks per inch. This permits the storing of digital information on a $5\frac{1}{4}$ inch floppy disc which would normally require an 8-inch floppy disc system.

2. The use of a disc mounting member which makes an interference fit with the floppy disc which is being employed. The floppy discs normally have a tolerance of two or three thousandths, and by employing a mandrel having a diameter corresponding to the largest size permitted by the tolerances, precise centering of the disc is assured with either a "line-on-line" precise fit, or a slight interference fit.

3. The use of a special precision ground lead screw plus a conical or tapered pin which is resiliently biased toward the lead screw, serves to accurately orient the carriage which carries the magnetic head. In addition, even after extended usage, no backplay or backlash is introduced into the lead screw to carriage drive.

4. The lead screw is mounted with arrangements which bias it toward the central mandrel upon which the floppy disc is mounted. In combination with the other features disclosed herein, the elimination of the thermal loop including the base, permits accurate positioning of the magnetic head without thermal variations.

5. A carriage is employed which locates the magnetic head in close physical proximity to the resiliently biased pin which interfits with the precision lead screw. This arrangement completes the closed loop from the mandrel to the magnetic head.

6. The use of a stepping motor having selected more accurately located angular step positions spaced apart by a predetermined number of normal steps of the stepping motor.

7. Providing circuitry for moving the stepping motor only by several of the predetermined steps at a time so that the motor only stops at the predetermined more accurately positioned locations. This has several advantages including more accurate orientation of the lead screw both by its more accurate angular positioning than would otherwise be possible, and also reduction of the frictional dead space as discussed hereinabove.

8. The use of special circuitry to rapidly move the stepping motor by the predetermined numbers of steps. This serves to achieve the advantages mentioned in the two previous paragraphs, with minimal time penalty.

The following brief additional comment relating to P. Lesca, U.S. Pat. No. 4,024,581, and S. A. Morgan, U.S. Pat. No. 4,001,888, are considered to be appropriate. Each of these two patents disclose a structure which is incidentally pertinent to one of the many elements which go into applicants' invention. However, the prior art patents do not recognize, apparently, that an entire and complete combinational arrangement is required, which takes into account the complete thermal loop and the factors which may contribute to errors. Thus, for example, with reference to FIG. 4 of the patent to P. Lesca, the structure 70 and the mandrel 35 appear to be similar in their construction to the corresponding arrangements disclosed by applicants. However, the Lesca patent does not disclose an interference fit. Further, the Lesca patent shows a thermal loop which includes the entire base of the unit extending out to the point where the lead screw is journalled remote from the mounting mandrel, and many other arrangements which will preclude precise location of the head with the disc needed to achieve close track spacing. Similarly, S. A. Morgan, U.S. Pat. No. 4,001,888 discloses in connection with FIG. 2, an arrangement in which the lead screw 32 is biased toward the central frame point 40 and the central hub 26. Again, however, further considerations relative to accurately locating the heads relative to the disc appear to be ignored. Thus, for example, note that the magnetic heads are carried on the "head carrier" 100 in FIG. 5 and the head carrier 100 is positioned relative to the carriage 50 by the elongated wires 120. Thus, these long wires 120 and their thermal variations in length as the unit is put into service, will clearly provide such an extended thermal loop that accurate positioning of the heads relative to the disc to achieve high accuracies would be impossible. Thus, as noted above, while certain prior art patents disclose isolated features forming part of applicant's integrated system, there is no teaching to combine these features to obtain the desired result of double density track spacing.

In conclusion, in the foregoing description one specific illustrative embodiment of the invention has been disclosed. Other arrangements could be employed to accomplish the same result of high disc storage capacity by slightly different mechanical or electrical arrangements. For example, the lead screw 34 could be resiliently biased in the opposite longitudinal direction, with the locking ring 37 being located on the other side of the inner thrust bearing 36, other precision follower arrangements for the carriage and lead screw drive could be employed, and different logic circuitry could be utilized in the stepper motor drive circuitry. Accordingly, the present invention is to be limited only by the scope of the appended claims.

What is claimed is:

1. A precision, high capacity floppy disc memory system having low thermal deviation, comprising:
a magnetic storage type floppy disc having a central mounting opening of a predetermined diameter;
means including a central rotatable hub having an outer diameter equal to or slightly greater than said predetermined diameter for accurately mounting said magnetic storage type floppy disc for rotation about said central mounting opening in the disc, the opening in said disc therefore making a "line on line" or an interference fit with said mounting means;
at least one head for magnetically reading and/or writing on said magnetic disc;
means including a lead screw having a precision groove for selectively shifting the position of said head to different tracks on said storage disc;
means for mounting the inner end of said lead screw fixed against longitudinal movement along the axis of said screw relative to said rotatable hub adjacent the center of said magnetic disc;
carriage means for supporting said head in close physical proximity to said lead screw;
tapered means secured to said carriage and resiliently mating with a single turn of the groove in said lead screw substantially in one plane only along the length of said lead screw and making contact with said lead screw at only two points or along only two lines to cause the magnetic head to precisely move to the radial position indicated by the orientation of said lead screw despite wear in said lead screw; said tapered means being in close physical proximity to said head;
stepping motor means for rotating said lead screw to shift said head between tracks, said stepping motor means having more accurately located angular step positions spaced apart by a predetermined number of normal steps of said stepping motor means; and
said apparatus further including means for actuating said stepping motor means in either direction by an angle equal to said predetermined number of steps to move said head between adjacent tracks which are less than 0.015 inch apart.

2. A high capacity floppy disc memory apparatus as defined in claim 1, wherein said stepper motor actuating means includes special logic circuit means for rapidly accelerating and then decelerating the rotor of said stepper motor in traversing said angle.

3. A precision high capacity floppy disc memory system as defined in claim 1 further comprising leaf spring means for mounting said stepper motor and biasing said lead screw substantially along the axis of said lead screw.

4. A high capacity floppy disc memory apparatus as defined in claim 1 further comprising:
means for clamping said floppy disc firmly and accurately onto said disc mounting means.

5. A precision high capacity floppy disc memory system as defined in claim 1 wherein said system includes means for actuating said stepping motor to move said head between adjacent tracks which are substantially 1/100 of an inch apart.

6. A precision, high capacity floppy disc memory system having low thermal deviation for use with floppy discs having a central opening of a predetermined diameter comprising:
means including a central shaft and associated hub having an outer diameter equal to or slightly greater than said predetermined diameter for accurately mounting a magnetic storage type floppy disc for rotation about a central opening in the disc, the opening in said disc making a "line-on-line" or an interference fit with said mounting means;

at least one head for magnetically reading and/or writing on said magnetic disc;

means including a lead screw having a precision groove for selectively shifting the position of said head to different tracks on said storage disc;

means for mounting the inner end of said lead screw against longitudinal movement adjacent the center of said magnetic disc;

carriage means for supporting said head in close physical proximity to said lead screw;

means secured to said carriage and resiliently mating with the groove in said lead screw substantially in one plane only along the length of said lead screw to cause the magnetic head to precisely move to the radial position indicated by the orientation of said lead screw despite wear in said lead screw, said means secured to said carriage being in close physical proximity to said head;

stepping motor means for rotating said lead screw to shift said head between tracks, said stepping motor means having more accurately located angular step positions spaced apart by a predetermined number of normal steps of said stepping motor means; and said apparatus further including means for actuating said stepping motor means in either direction by an angle equal to said predetermined number of steps to move said head between adjacent tracks which are less than 0.015 inch apart.

7. A precision high capacity floppy disc memory system as defined in claim 6 further comprising means including a leaf spring for mounting said stepper motor means and biasing said lead screw substantially along the axis of said lead screw toward said hub.

8. A precision high capacity floppy disc memory system as defined in claim 6 wherein said system includes means for actuating said stepping motor to move said head between adjacent tracks which are substantially 1/100 of an inch apart.

9. A precision, high capacity floppy disc memory system having low thermal deviation for use with floppy discs having a central opening of a predetermined size comprising:

means including a central rotatable hub having an outer diameter equal to or slightly greater than said predetermined diameter for accurately mounting a magnetic storage type floppy disc for rotation about a central opening in the disc, the opening in said disc making a "line-on-line" or an interference fit with said mounting means;

at least one head for magnetically reading and/or writing on said magnetic disc;

means including a lead screw having a precision groove for selectively shifting the position of said head to different tracks on said storage disc;

means for mounting the inner end of said lead screw against longitudinal movement adjacent the center of said magnetic disc;

carriage means for supporting said head in close physical proximity to said lead screw;

means secured to said carriage and resiliently mating with the groove in said lead screw substantially on one side only of said lead screw to cause the magnetic head to precisely move to the radial position indicated by the orientation of said lead screw despite wear in said lead screw; and stepping motor means for rotating said lead screw to shift said head between adjacent tracks which are less than 0.015 inch apart.

10. A precision high capacity floppy disc memory system as defined in claim 9 wherein said system includes means for actuating said stepping motor to move said head between adjacent tracks which are substantially 1/100 of an inch apart.

11. A high capacity memory apparatus for use with floppy magnetic discs having a central opening, comprising:

means, including a hub making an interference fit with the central opening in said disc, for accurately mounting a magnetic storage type floppy disc for rotation about a central opening in the disc;

at least one head for magnetically reading and/or writing on said magnetic disc;

means including a lead screw for selectively shifting the position of said head to different tracks on said storage disc;

means including a carriage and a resilient follower element for engaging said lead screw for mounting said head in close proximity to said lead screw and follower to accurately shift the position of said head as said lead screw is rotated;

mounting means for said lead screw for limiting thermal tolerances in the location of said follower element substantially to the section of said lead screw between said mandrel and said follower element;

stepping motor means for rotating said lead screw to shift said head between tracks, said stepping motor means having more accurately located angular step positions spaced apart by a predetermined number of normal steps of said stepping motor means; and means for actuating said stepping motor in either direction by an angle equal to said predetermined number of steps, to shift said head between adjacent tracks which are less than 0.015 inch apart.

12. A high capacity floppy disc memory apparatus as defined in claim 11, wherein said stepper motor actuating means includes special logic circuit means for rapidly accelerating and then decelerating the rotor of said stepper motor in traversing said angle.

13. A precision, high capacity floppy disc memory system having low thermal deviation, comprising:

a magnetic storage type floppy disc having a central mounting opening of a predetermined diameter;

means including a central rotatable hub having an outer diameter equal to or slightly greater than said predetermined diameter for accurately mounting said magnetic storage type floppy disc for rotation about a central opening in the disc, the opening in said disc making a "line-on-line" or an interference fit with said mounting means;

at least one head for magnetically reading and/or writing on said magnetic disc;

means including a lead screw having a precision groove for selectively shifting the position of said head to different tracks on said storage disc;

means for mounting the inner end of said lead screw against longitudinal movement adjacent the center of said magnetic disc;

carriage means for supporting said head in close physical proximity to said lead screw;

tapered means secured to said carriage and resiliently mating with the groove in said lead screw to cause the magnetic head to precisely move to the radial position indicated by the orientation of said lead screw despite wear in said lead screw; and means for rotating said lead screw to shift said head between adjacent tracks, which are less than 0.015 inch apart.

14. A precision high capacity floppy disc memory system as defined in claim 13 wherein said system includes means for actuating said stepping motor to move said head between adjacent tracks which are substantially 1/100 of an inch apart.

* * * * *